United States Patent
Bradley et al.

(10) Patent No.: US 11,413,734 B2
(45) Date of Patent: Aug. 16, 2022

(54) WORKING CYLINDER FOR POWER TOOL WITH PISTON LUBRICATING SYSTEM

(71) Applicant: Kyocera Senco Industrial Tools, Inc., Cincinnati, OH (US)

(72) Inventors: David D. Bradley, Bethel, OH (US); Thomas A. McCardle, Mt. Healthy, OH (US); Anthony D. Kabbes, Cincinnati, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 140 days.

(21) Appl. No.: 16/654,315

(22) Filed: Oct. 16, 2019

(65) Prior Publication Data

US 2020/0122308 A1 Apr. 23, 2020

Related U.S. Application Data

(60) Provisional application No. 62/746,941, filed on Oct. 17, 2018.

(51) Int. Cl.
*B25C 1/04* (2006.01)
*B25C 7/00* (2006.01)
(Continued)

(52) U.S. Cl.
CPC .............. *B25C 1/041* (2013.01); *B25C 1/047* (2013.01); *B25C 7/00* (2013.01); *F15B 15/1452* (2013.01);
(Continued)

(58) Field of Classification Search
CPC ........... B25C 1/04; B25C 1/041; B25C 1/047; B25C 7/00; F15B 15/1452; F16J 1/08; F16J 9/08; F16J 15/162
See application file for complete search history.

(56) References Cited

U.S. PATENT DOCUMENTS

| 860,536 A | 7/1907 | Ellingham |
| 1,774,967 A | 9/1930 | Ellis |

(Continued)

FOREIGN PATENT DOCUMENTS

| DE | 15 10 164 A1 | 3/1970 |
| DE | 8711784 | 8/1987 |

(Continued)

OTHER PUBLICATIONS

"Permatex® Anti-Seize Lubricant", 2017 [retrieved on Dec. 20, 2021], Permatex, Inc., 1pg., Retrieved from the Internet: <URL: https://krayden.com/technical-data-sheet/permatex-133-anti-seize-lubricant-technical-data-sheet/> (Year: 2017).*

(Continued)

*Primary Examiner* — Joshua G Kotis

(74) *Attorney, Agent, or Firm* — Frederick H. Gribbell; Russell F. Gribbell

(57) ABSTRACT

A fastener driving tool with a working cylinder and a piston, the piston outer surface having a lubricant-saturated foam material that stores and dispenses lubricant into the piston-cylinder wall interface, thereby increasing the performance and lifespan of the tool. Another embodiment discloses a two-part piston in which the bottom portion is made of metal and absorbs the main mechanical loading forces of the piston drive and return strokes, and the top portion is made of a non-metallic material that has surfaces that act as sliding bearings against the inner wall of the cylinder.

15 Claims, 8 Drawing Sheets

(51) Int. Cl.
*F15B 15/14* (2006.01)
*F16J 1/08* (2006.01)
*B25C 1/06* (2006.01)
*F15B 21/048* (2019.01)

(52) U.S. Cl.
CPC . *F16J 1/08* (2013.01); *B25C 1/06* (2013.01); *F15B 21/048* (2013.01)

(56) References Cited

U.S. PATENT DOCUMENTS

| | | | |
|---|---|---|---|
| 2,026,409 A * | 12/1935 | Wheeler | F16J 15/20 277/529 |
| 2,419,192 A | 4/1947 | Anderson | |
| 2,575,455 A | 11/1951 | Lang | |
| 2,635,932 A | 4/1953 | Heusser | |
| 2,797,971 A * | 7/1957 | Greenough | F16J 15/162 277/448 |
| 2,814,041 A | 11/1957 | Haley | |
| 2,933,290 A | 4/1960 | Ryder | |
| 3,150,488 A | 9/1964 | Haley | |
| 3,276,417 A * | 10/1966 | Flowers | G01L 7/16 116/34 R |
| 3,589,588 A | 6/1971 | Vasku | |
| 3,661,216 A * | 5/1972 | Yamanaka | B25D 9/08 173/17 |
| 3,738,231 A * | 6/1973 | Zurner | F16J 9/22 92/159 |
| 3,847,322 A | 11/1974 | Smith | |
| 3,878,902 A | 4/1975 | Matsuo | |
| 4,005,763 A | 2/1977 | Wallis | |
| 4,203,353 A | 5/1980 | Bernham et al. | |
| 4,215,808 A | 8/1980 | Sollberger et al. | |
| 4,530,455 A | 7/1985 | Vomberger | |
| 4,557,351 A | 12/1985 | Volk | |
| 4,741,518 A | 5/1988 | Wallis | |
| 4,881,723 A * | 11/1989 | Bauer | F16F 7/09 607/91 |
| 5,199,627 A | 4/1993 | Christensen | |
| 5,295,564 A | 3/1994 | Stadelmann | |
| 5,503,319 A | 4/1996 | Lai | |
| 5,557,905 A | 11/1996 | Cook | |
| 5,605,268 A | 2/1997 | Hayashi | |
| 5,720,423 A | 2/1998 | Kondo et al. | |
| 6,023,989 A | 2/2000 | Imase | |
| 6,533,156 B1 | 3/2003 | Chang | |
| 6,568,313 B2 * | 5/2003 | Fukui | F15B 15/1452 92/168 |
| 6,685,193 B2 * | 2/2004 | Roberts | B25C 1/08 277/459 |
| 6,938,811 B2 | 9/2005 | Ehmig et al. | |
| 6,997,367 B2 | 2/2006 | Hu | |
| 7,040,521 B2 | 5/2006 | Kolodziej et al. | |
| 7,225,961 B1 | 6/2007 | Lee | |
| 7,225,962 B2 | 6/2007 | Porth et al. | |
| 7,404,866 B2 | 7/2008 | Nakanishi | |
| 7,494,036 B2 | 2/2009 | Shima | |
| 8,011,547 B2 | 9/2011 | Leimbach et al. | |
| 8,258,086 B2 | 9/2012 | Patel | |
| 8,267,297 B2 | 9/2012 | Leimbach et al. | |
| 8,313,545 B2 * | 11/2012 | Panasik | B01D 46/106 55/385.1 |
| 9,669,531 B2 * | 6/2017 | Gensmann | B25D 11/005 |
| 10,689,743 B2 * | 6/2020 | Saito | C22C 29/08 |
| 10,927,953 B2 * | 2/2021 | Svrcek | F02F 5/00 |
| 2003/0218042 A1 | 11/2003 | Odoni et al. | |
| 2005/0082334 A1 | 4/2005 | Hu | |
| 2005/0217875 A1 | 10/2005 | Forster | |
| 2005/0279802 A1 * | 12/2005 | Moeller | B25C 1/08 227/130 |
| 2006/0180631 A1 | 8/2006 | Pedicini | |
| 2007/0007319 A1 | 1/2007 | Simonelli | |
| 2007/0045377 A1 | 3/2007 | Towfighi | |
| 2007/0144753 A1 * | 6/2007 | Miller | B25F 5/026 173/217 |
| 2008/0041914 A1 | 2/2008 | Simonelli | |
| 2008/0067213 A1 | 3/2008 | Shima | |
| 2008/0190986 A1 | 8/2008 | Chang | |
| 2008/0190988 A1 | 8/2008 | Pedicini | |
| 2011/0192621 A1 | 8/2011 | Braun | |
| 2017/0080554 A1 | 3/2017 | Moore et al. | |
| 2017/0282341 A1 * | 10/2017 | Wolf | B25C 1/047 |
| 2017/0326715 A1 * | 11/2017 | Chen | B25C 5/13 |
| 2020/0024540 A1 * | 1/2020 | Miyamoto | C10M 125/10 |

FOREIGN PATENT DOCUMENTS

| | | | | |
|---|---|---|---|---|
| FR | 2527295 A3 * | 11/1983 | | F16J 1/08 |
| GB | 755685 A * | 8/1956 | | E21D 15/515 |
| GB | 1 559 571 A | 1/1980 | | |
| JP | 2017528331 | 9/2017 | | |
| WO | 2017056810 | 4/2017 | | |

OTHER PUBLICATIONS

"The World of Anti_Seize"; CRC Industries Americas Group; Sep. 18, 2017; [retrieved on Apr. 1, 2022]. Retrieved from the Internet <URL:https://www.crcindustries.com/world-anti-seize/> (Year: 2017).*

"Why Use An Anti-Seize?"; A.S.T. Industries. Inc.; Mar. 2014; [retrieved on Apr. 1, 2022]. Retrieved from the Internet <URL:https://www.antiseize.com/PDFs/why_use_an_antiseize.pdf> (Year: 2014).*

Two-page "Tool Assembly" drawing of Senco Model No. SN952XP pneumatic tool; dated Mar. 4, 2008; representative of earlier tools in public use before 2006; Admitted Prior Art.

One-page magnified view of "Tool Assembly" drawing of Senco Model No. SN952XP pneumatic tool; Mar. 4, 2008; representative of earlier tools in public use before 2006; Admitted Prior Art.

International Search Report, PCT/US19/56422,19 pages (dated Feb. 10, 2020).

* cited by examiner

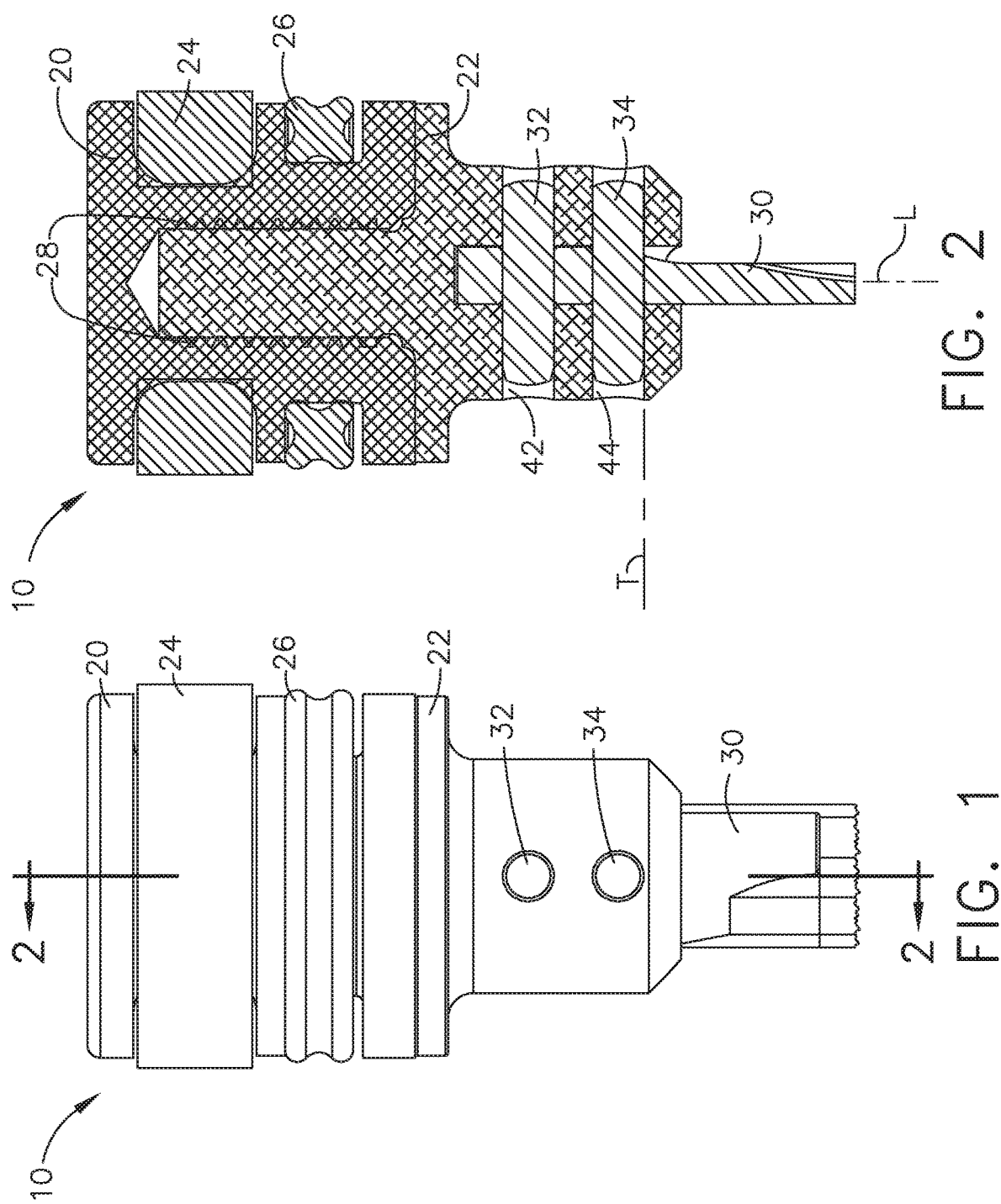

WORKING CYLINDER FOR POWER TOOL WITH PISTON LUBRICATING SYSTEM

CROSS-REFERENCE TO RELATED APPLICATIONS

The present application claims priority to provisional patent application Ser. No. 62/746,941, titled "WORKING CYLINDER FOR POWER TOOL WITH PISTON LUBRICATING SYSTEM," filed on Oct. 17, 2018.

TECHNICAL FIELD

The technology disclosed herein relates generally to fastener driving tools and is particularly directed to such tools of the type which use pressurized air to drive a piston that, in turn, causes a driver blade to force a fastener into a target workpiece. Embodiments are specifically disclosed which use lubricant-saturated porous media, such as a foam material, surrounding a portion of the outside of a piston, inside a working cylinder, to continually lubricate and clean the piston and working cylinder, enhancing the performance over a greater lifetime of the tool.

In a second embodiment fastener driving tool, the lubricant-saturated porous media (e.g., foam material) has a first portion above a seal, and a second portion below a seal. This "double" foam material improves the lubrication below the seal, and also cleans beneath the seal.

In a third embodiment, a two-part piston is mechanically attached to a driver assembly for a fastener driving tool. The upper portion of the piston is made of a non-metallic material and serves as guidance bearings against the cylinder wall that will not scratch the surface of the anodized cylinder wall. The guidance bearings are very beneficial in maintaining the position of the piston during a drive and return stroke. A rubber seal serves as the sealing surface. A lower portion of the piston is metal, which is capable of withstanding the stresses associated with the impact and other forces during the drive and return strokes. This lower portion is rigidly attached to the driver so that rocking and other changes in position of the driver are minimized.

STATEMENT REGARDING FEDERALLY SPONSORED RESEARCH OR DEVELOPMENT

None.

BACKGROUND

Many conventional fastener driving tools use a piston to move a driver blade that forces a nail or staple into a target workpiece, as part of their operational cycle. These pistons are typically driven by pressurized gas, or in some cases, by combustion air. In a product line of pressurized gas tools known as FUSION® that are sold by Kyocera Senco Industrial Tools, Inc., pressurized gas is stored in a main storage chamber and that gas is not vented to atmosphere, but instead is re-used multiple times, and can drive multiple driving strokes (including operational cycle counts in the tens of thousands, per charge of pressurized gas).

One of the challenges is to provide a lubricated surface between the piston and the inner cylinder wall to reduce friction, wear, and eventual loss of charge pressure. This surface is difficult to lubricate during the life of the tool due to the fact that the main storage chamber and the working cylinder are sealed. The motion of the piston tends to wipe the lubricant off the sliding surfaces over time, which then begins to wear the sealing surface. Such a worn sealing surface can result in pressure loss, as the charge of air escapes past the sealing surface.

In a conventional FUSION® tool sold by Kyocera Senco, such as illustrated in FIG. 8, a working cylinder portion 205 of the tool, has a movable piston subassembly 210. The tool has a main storage chamber 274, exhibiting an outer pressure vessel wall 278. Within the main storage chamber is a working cylinder 271, and the working cylinder exhibits a cylinder wall 270. Inside the cylinder wall 270 is a movable piston 280, and above the piston is a gas pressure chamber 276, whereas below the piston is a venting chamber 275 (in this view of FIG. 8).

The piston 280 has a seal 286, and above the seal (in this view) is a first slidable bearing 288, and below the seal (in this view) is a second slidable bearing 289. Between the second slidable bearing 289 and the seal 286 is a grease reservoir 282. The grease reservoir provides lubrication for the tool.

At the lower end of the piston 280 is an opening in which a top end portion 230 of a driver 290 is held in place by a connecting pin 232. The driver 290 exhibits driver teeth 292, and extends out of the cylinder base 296. Between the bottom of the main storage chamber 274, and the cylinder base, is a stationary piston stop 284.

The current FUSION® tool utilizes a lubricant that during manufacture is deposited on the cylinder wall and on the piston seal. This lubricant is important to the operation of the tool. However, the lubricant cannot be resupplied without disassembling the tool.

Another challenge is to construct the piston with a hard material that also slides along the cylinder wall. The current FUSION® tool, as depicted in FIG. 8, illustrates the piston as a solid piece of material typically made of metal. Piston slidable bearings 288 and 289 are necessary to maintain the guidance of the piston during a drive and return stroke, without scoring the cylinder inner wall.

SUMMARY

Accordingly, it is an advantage to include a small volume or recess in the outer perimeter of the piston of a power tool that retains a porous media, such as foam material, that holds and dispenses a liquid lubricant, which increases the life of the piston, cylinder, and the piston seals.

It is another advantage to provide a lubricant used with a piston of a fastener driving tool, by storing the lubricant in open cell foam material in a recess of the piston outer surface, in which the foam holds and continuously deposits the lubricant along the piston and cylinder wall during the life of the tool. This provides improved wear characteristics that result in improved pressure retention over a longer tool life. The lubricant captured in the foam will tend to be constrained regardless of tool orientation.

It is yet another advantage to provide a two-part piston that is mechanically attached to a driver assembly for a fastener driving tool. The upper material is non-metal and serves as guidance bearings against the cylinder wall that will not scratch the surface of the anodized cylinder.

It is yet a further advantage to provide a piston with two separate portions of porous media, such as a foam material, for use in a fastener driving tool. At least the top foam portion stores and dispenses lubricant over the life of the tool. The lower foam portion acts as a debris "cleaner," removing debris that may enter the cylinder such as wood, gypsum, metallic particles, collation tape, sand, dirt, and moisture, or other items that are commonly found on construction jobsites. This debris build-up is due to the underside of the piston being exposed to ambient air.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a piston for use in a power tool is provided, which comprises: a top outer surface, a bottom outer surface, and a side wall outer surface that runs between the top and bottom outer surfaces; a first recess in the side wall outer surface of the piston; and a porous media positioned in the first recess along the side wall outer surface of the piston, the porous media containing a liquid lubricant material.

In accordance with another aspect, a piston for use in a power tool is provided, which comprises: a top outer surface, a bottom outer surface, and a cylindrical side wall outer surface that runs between the top and bottom outer surfaces, the piston having a circular cross-section; a first circumferential recess in the cylindrical outer surface of the piston; and an annular porous media positioned in the first circumferential recess, the porous media containing a liquid lubricant material.

In accordance with yet another aspect, a working cylinder for a power tool is provided, which comprises: a hollow cylinder that includes a movable two-part piston, the cylinder including a variable displacement volume on a first side of the piston, and the cylinder including a variable venting volume on a second, opposite side of the piston; said two-part piston, comprising: a first portion made of a metallic material that is proximal to the second side of the piston, the first portion being sufficiently small in outer diameter so that it does not make physical contact with an inner surface of the hollow cylinder; a second portion made of a non-metallic material that is proximal to the first side of the piston, the second portion including at least one surface that makes slidable contact with the inner surface of the hollow cylinder, the at least one surface thereby acting as a slidable bearing surface for the piston; the first portion and the second portion being attached to one another in a manner such that the first and second portions always move together as a single piston subassembly.

In accordance with still another aspect, a piston for use in a power tool is provided, which comprises: a top outer surface, a bottom outer surface, and a cylindrical side wall outer surface that runs between the top and bottom outer surfaces, the piston having a circular cross-section; a first circumferential recess in the cylindrical outer surface of the piston; and a first annular porous media positioned in the first circumferential recess; a second circumferential recess in the cylindrical outer surface of the piston, located at a different position along the cylindrical outer surface of the piston; a second annular porous media positioned in the second circumferential recess; and at least one of the first and second annular porous media containing a liquid lubricant material.

In accordance with a further aspect, a piston for use in a power tool is provided, which comprises: a top outer surface, a bottom outer surface, and a side wall outer surface that extends between the top and bottom outer surfaces; a first recess in the side wall outer surface of the piston; and a porous media positioned in the first recess along the side wall outer surface of the piston, the porous media containing a liquid lubricant.

In accordance with a yet further aspect, a working cylinder for a power tool is provided, which comprises: a hollow cylinder that includes a movable two-part piston, the cylinder including a variable displacement volume on a first side of the piston, and the cylinder including a variable venting volume on a second, opposite side of the piston; the two-part piston comprising: a first portion made of a metal that is proximal to the second side of the piston, the first portion being sufficiently small in outer width so that it does not make physical contact with an inner surface of the hollow cylinder; a second portion made of a non-metal that is proximal to the first side of the piston, the second portion including at least one surface that makes slidable contact with the inner surface of the hollow cylinder, the at least one surface thereby acting as a slidable bearing surface for the piston; and the first portion and the second portion being attached to one another in a manner such that the first and second portions always move together as a single piston subassembly.

In accordance with a still further aspect, a piston for use in a power tool is provided, which comprises: a top outer surface, a bottom outer surface, and a side wall outer surface that extends between the top and bottom outer surfaces; a first recess in the side wall outer surface of the piston; a first porous media positioned in the first recess; a second recess in the side wall outer surface of the piston, located at a different position along the side wall outer surface of the piston; a second porous media positioned in the second recess; and at least one of the first porous media and second porous media containing a liquid lubricant.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIG. 1 is a side view of a piston subassembly for use in a fastener driving tool, as constructed according to the principles of the technology disclosed herein.

FIG. 2 is a section view along the line 2-2 of FIG. 1.

DETAILED DESCRIPTION

Figure 3:
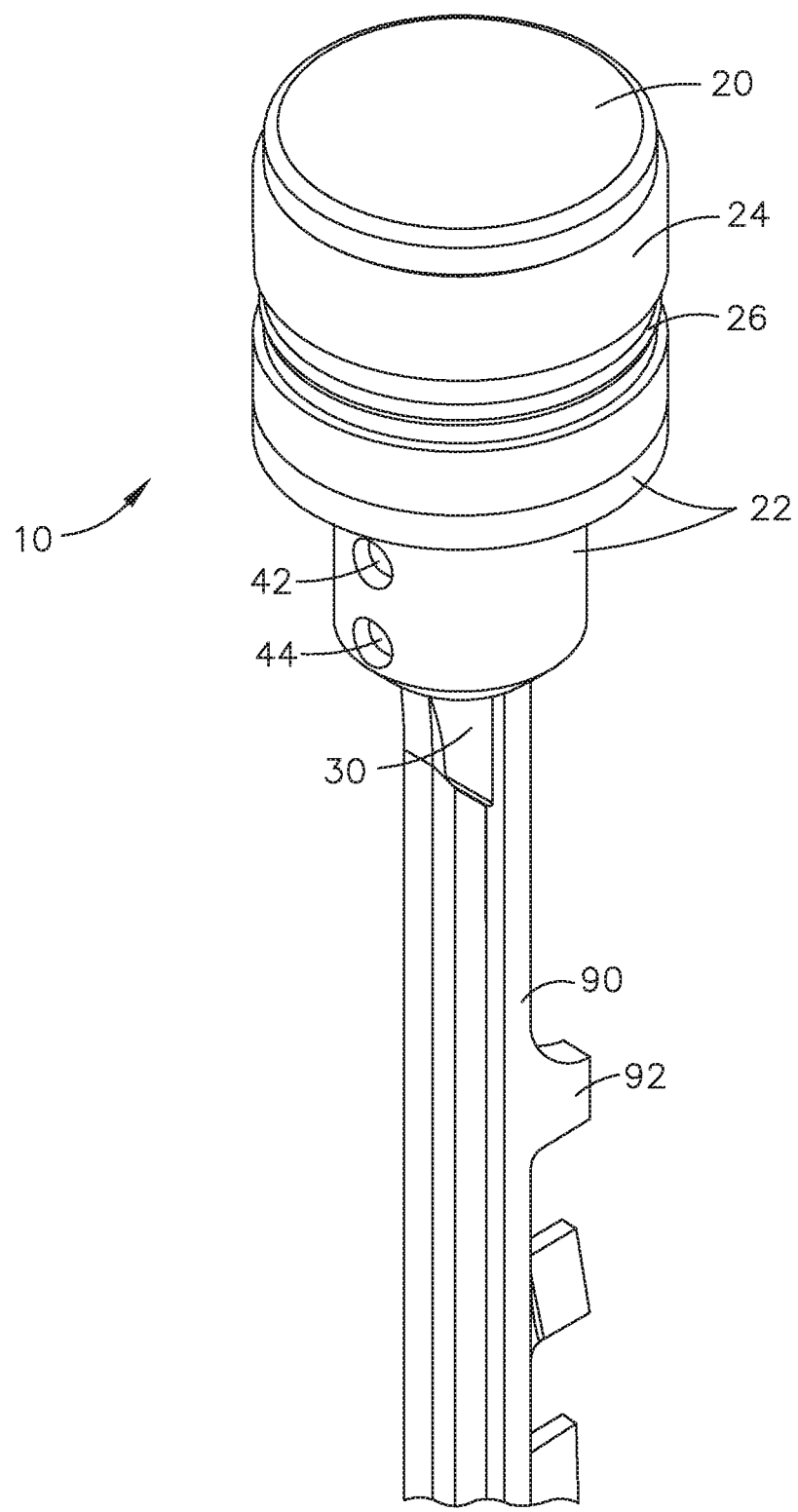
FIG. 3 is a perspective view showing the driver blade and driver teeth of the tool of FIG. 1.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, the terms "communicating with" and "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

Referring now to FIG. 1, a first embodiment of a piston subassembly for use in a fastener driving tool generally designated by the reference numeral 10 has two main halves: a piston top 20, and a piston bottom 22. The piston top 20 is constructed of a hard plastic, or other non-metallic material, preferably Delrin, whereas the piston bottom 22 is constructed of metal, preferably aluminum. The piston bottom is constructed with a stem that has a plurality of male threads 28, and the piston top has a threaded opening to receive the stem, in which the threads are female. The piston top is threadably attached using the piston bottom's male threads (see FIG. 2), such that both piston parts move together as a single piston subassembly 10.

It should be noted that the piston design described above is merely a preferred embodiment for constructing the overall piston, and other two-piece piston designs could be used without departing from the principles of this technology. For example, as one alternative design, the two piston halves 20 and 22 may be attached to one another through any type of reliable mechanical connection, including a pin connector. Alternatively again, the two piston halves 20, 22 could be constrained without mechanical fasteners so that they always move together. Furthermore, the gas pressure of the working cylinder 71 (see FIG. 4) will tend to keep the top piston half 20 firmly pressed against the bottom piston half 22 under almost all circumstances of tool operation.

The general shape of piston subassembly 10 includes a cylindrical outer surface which has a circular cross-section, as can be seen in FIG. 3. The center of the circular cross-section is located along a longitudinal axis of the piston, in which that longitudinal axis can be seen at "L" on FIG. 2. It will be understood that the exact shape of the outer perimeter of the piston, and the exact shape of the corresponding inner surface of the cylinder sleeve, do not necessarily have to be precisely circular. Instead, these surfaces could have other geometric shapes, so long as they are "mating shapes," and still fall within the principles of the technology disclosed herein. With regard to the disclosure presented herein, it will be assumed that the piston indeed has a circular cross-section, and therefore, the inner surface of the cylinder sleeve is also circular.

A driver 90 (see FIG. 3) has an upper attachment portion 30 that is installed during manufacture into an opening in the piston bottom half 22. The piston bottom 22 exhibits two through openings 42 and 44 that are transverse to the driver opening. Two connecting pins 32 and 34 are used to secure the driver, at the driver upper portion 30, to the piston bottom 22. It will be understood that the various directional nomenclature provided above is with respect to the illustration of FIG. 2, and the first embodiment can be used in many other angular positions, without departing from the principles of this technology. The use of these two connecting pins 32 and 34 help to keep the piston subassembly 10 aligned with the driver 90.

It will be further understood that this piston subassembly 10 is designed to move in a reciprocating manner along a direction that will be referred to herein as a longitudinal axis. On FIG. 2, such a longitudinal axis is designated by the letter "L." The connecting pins 32 and 34 are placed in a perpendicular, transverse direction, which is indicated on FIG. 2 by the letter "T."

The piston top portion 20 has two circumferential recesses or grooves located on the outside surface of the piston. The upper groove (or recess) holds an annular-shaped material 24 that comprises a porous media such as foam, and the lower groove (or recess) holds an annular seal 26, which in this illustrated embodiment is a lobed seal. (Note that the annular seal 26 is also sometimes referred to herein as a "perimeter seal," since it runs around the outer perimeter of the piston.) The porous media 24 holds a liquid lubricant material (such as MOBIL VACTRA 2™ oil, a premium ISO Viscosity Grade 68 slideway oil), and acts as a reservoir for the lubricant. The porous material can comprise various specific types of materials, such as an open cell foam material, or a sponge-like foam material, or an air filter material that is resistant to oil.

An open cell foam material works well for the purposes described herein, and it will be understood that the terms "foam" or "foam material" as used hereinafter refer to all such types of porous media that are able to hold an appropriate liquid or grease lubricant material for use in these power tools. It will also be understood that, for the purposes of this disclosure, the phrase "circumferential recess" refers to a recess or "groove" in the outer surface of the piston, for example, regardless of the exact shape of the cross-section of that piston; in other words, the piston could have a circular or elliptical cross-section shape, or even a square or rectangular cross-section shape, yet the recess being referred herein would nevertheless be referred to as a "circumferential" recess, so that these recesses are better understood by the reader of this disclosure.

The porous media 24 may hold a variety of alternative liquid lubricant materials. The liquid lubricant material type used will alter the friction of the piston 10 during a lift cycle. It would be desirable for this liquid lubricant to be a lightweight oil having a viscosity around ISO 68 (about SAE 20W).

It should be noted that the "liquid" lubricant used for this purpose may contain solid particles as a form of grease in solution with a liquid; or possibly the "liquid" lubricant used could mainly comprise an appropriate grease material (with or without solid particles) that, when in use, acts as a semi-liquid or semi-solid material to spread out along the piston's surfaces as the piston undergoes reciprocating movements.

Preferably, the foam material 24 comprises open cell foam, such as a reticulated urethane foam, having an average cell density of about 60-80 pores per inch. The foam material should be resistant to lubricating oils, and perhaps also to grease. Certain types of air filter material can be used for the foam material 24, including pre-filters used for Koehler or Briggs and Stratton lawnmower engines.

The foam 24 is in constant contact with the inner cylinder wall, slowly dispensing lubricant over the life of the tool. The seal 26 is also in constant contact with the cylinder wall, and keeps the lubricant contained inside the cylinder; moreover, the seal retains the high gas pressure above the piston (in the variable displacement volume 76). The cylinder and the seal may be pre-coated with an anti-seize lubricant, such as PERMATEX 133A™. (The anti-seize is wiped on, like a grease.) It is to be noted that the foam 24 does not act as a seal per se, but is intended to store and dispense lubricant along the cylinder wall. Also, a second seal "above" the foam 24 is not necessary, because any lubricant that moves "above" the seal will be re-used by subsequent piston movements.

It should also be noted that, once the tool has been fully assembled, the foam 24 becomes the sole source of the liquid lubricant for the cylinder and piston. More specifically, the foam acts as an inhibiting factor that prevents the lubricant from being dispensed too quickly, thereby increasing the normal life of the entire tool.

Although the statement in the preceding paragraph is true for certain embodiments, alternative embodiments are envisioned where a grease material is used in conjunction with a liquid lubricant, and the grease is typically not directly applied to the foam material. Instead, the grease is applied to the inner surface of the cylinder sleeve (cylinder wall 70) before the piston is installed. An example of a suitable grease material is VALVOLINE CRIMSON™ multi-purpose grease. Another alternate example grease lubricant material is KLUBER ISOFLEX TOPAS NB 52™. Yet another alternate example is KLUBER ISOFLEX TOPAS NB 152™.

As discussed above, various types of lubricants may work well in this fastener driving tool working cylinder. The liquid lubricants are generally to be applied to the foam 24, as discussed above. The grease lubricants are generally to be applied to the seal 26 and/or to the inner surface of the cylinder wall 70. In one alternative embodiment, both a grease material and a liquid material are simultaneously used, such as the VALVOLINE CRIMSON™ grease and the MOBIL VACTRA 2™ oil.

If a grease material is to be used in the working cylinder 71, then it would be applied to the inner surface of the cylinder before the piston subassembly 10 is installed therein. Furthermore, the grease can also be applied to the seal 26, as per the tool designer's choice. If grease is used at the seal 26, that grease can be applied into the recess where the seal goes either before or after the seal 26 is installed onto the upper piston 20. In general, it is preferred to install the foam 24 into its recess in the upper piston 20 before any liquid lubricant is applied to that foam 24. (It is difficult to install a "wet" piece of foam into that groove or recess.) Finally, it is likely better if at least some of the grease is applied "beneath" the seal 26—i.e., into the small space between the seal and the bottom surface of the groove. The more grease—and the more liquid lubricant—that can be "stored" in this working cylinder and piston combination, the longer that combination will properly operate.

Figure 4:
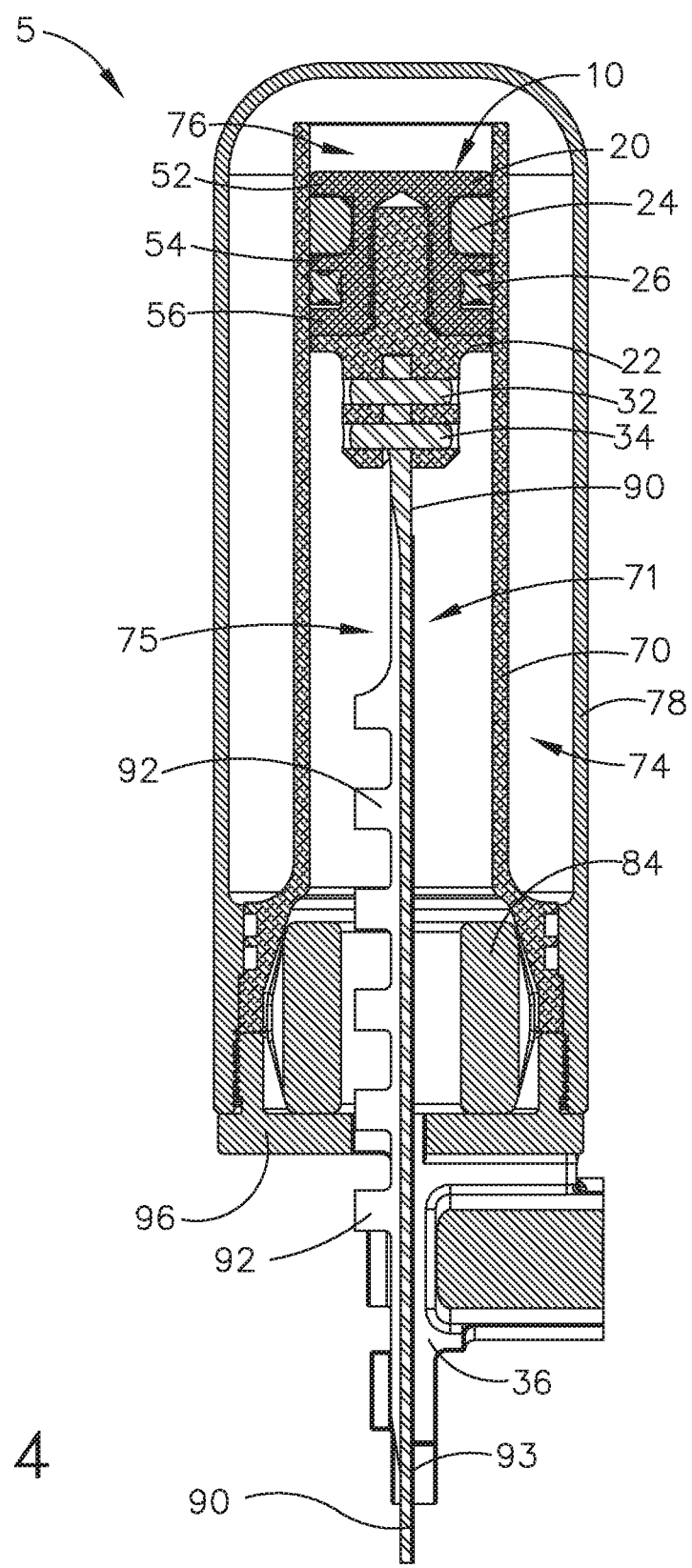
FIG. 4 is a section view of a working cylinder of the fastener driving tool of FIG. 1, showing the piston subassembly.

Referring now to FIG. 4, the piston subassembly 10 is shown integrated into a working cylinder portion of a driving tool, which is generally referred to by the reference numeral 5. An outer wall 78 contains a main storage chamber 74, in which a working cylinder 71 encloses the piston subassembly 10. The working cylinder portion includes a cylinder base 96 that fully encloses the main storage chamber 74. A gas pressure chamber 76 is contained inside the working cylinder, above the piston top 20. The gas chamber 76 contains a variable volume, or "displacement volume," of pressurized gas that is used to drive the piston during operation. Beneath the piston bottom 22 is a cylinder "venting chamber" 75, which vents to atmosphere.

During operation, the piston subassembly 10 slides along a cylinder inner wall (or "sleeve") 70 of the working cylinder 71. The bearing surfaces 52, 54, and 56 of piston top 20 contact the cylinder wall 70 during normal movement. The piston bottom 22 is slightly smaller in diameter and does not contact the cylinder wall. As the piston subassembly slides along the cylinder wall, the piston is stopped by a stationary piston stop 84.

These bearing surfaces 52, 54, and 56 are quite different than previous designs using metal pistons with insert bearings. In previous designs, the insert bearings provided a slidable surface along the cylinder wall, which allowed the piston to not touch the cylinder wall at all. In this new design, the bearing surfaces 52, 54, and 56 of the piston subassembly 10 actually touch and slide along the cylinder wall surface, and they act as low-friction guide bearing surfaces, as well.

The driver 90 moves with the piston subassembly 10 during operation. The driver exhibits driver teeth 92. The driver moves along a driver track 93 through a guide body 36. The guide body 36 is mounted beneath the cylinder base 96. The guide body receives a fastener from a magazine (not shown), and guides the driver and the fastener to an exit portion of the tool, and into a workpiece. It will be understood that the various directional nomenclature provided above is with respect to the illustration of FIG. 4, and the first embodiment can be used in many other angular orientations, without departing from the principles of this technology.

Figure 5:
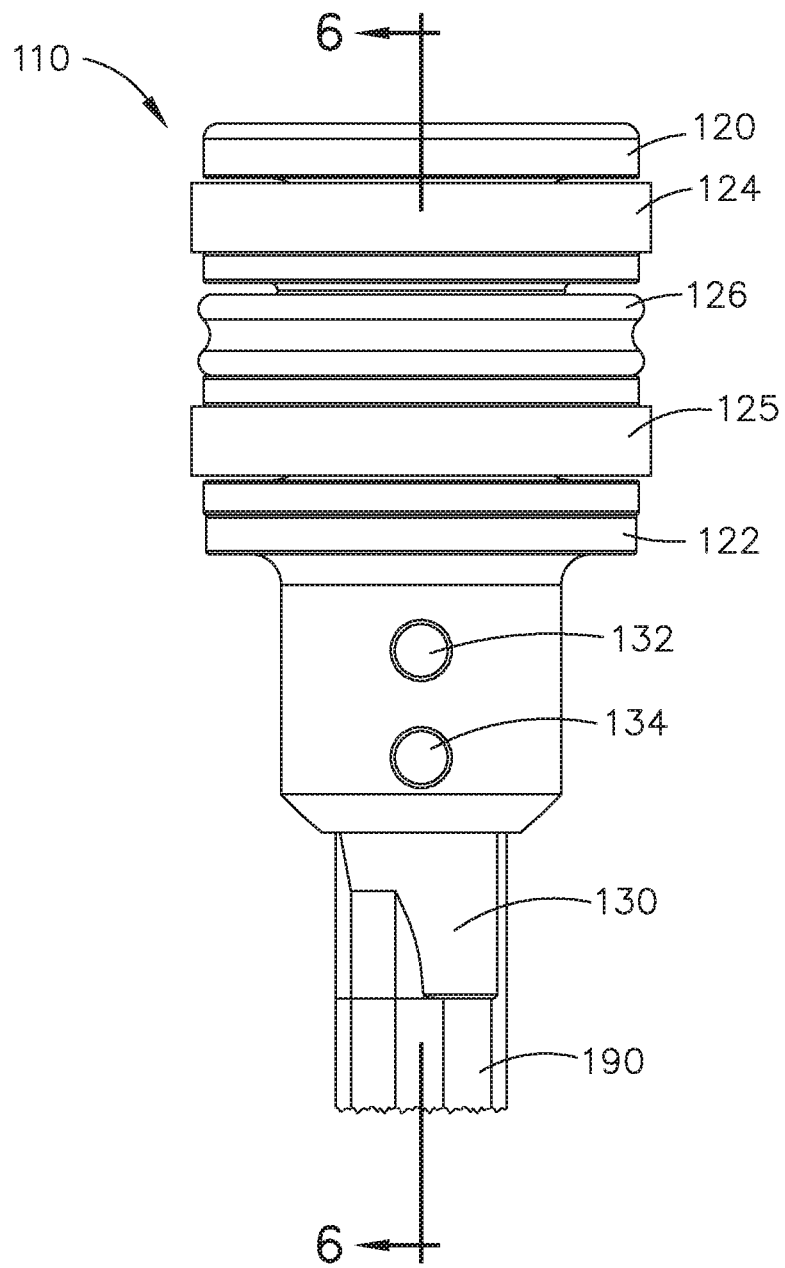
FIG. 5 is a side view of a second embodiment of a piston subassembly for use in a fastener driving tool, as constructed according to the principles of the technology disclosed herein.

Referring now to FIG. 5, a second embodiment of a piston subassembly for use in a fastener driving tool generally designated by the reference numeral 110 has two main halves: a piston top 120, and a piston bottom 122. The piston top 120 is constructed of a hard plastic, or other non-metallic material, preferably Delrin, whereas the piston bottom 122 is constructed of metal, preferably aluminum. The piston bottom is constructed with a stem that has a plurality of male threads 128, and the piston top has a threaded opening to receive the stem, in which the threads are female. The piston top is threadably attached using the piston bottom's male threads (see FIG. 6), such that both piston parts move together as a single piston subassembly. It should be noted that the two piston halves 120 and 122 may be attached to one another through any type of reliable mechanical connection, including a pin connector for example.

Figure 6:
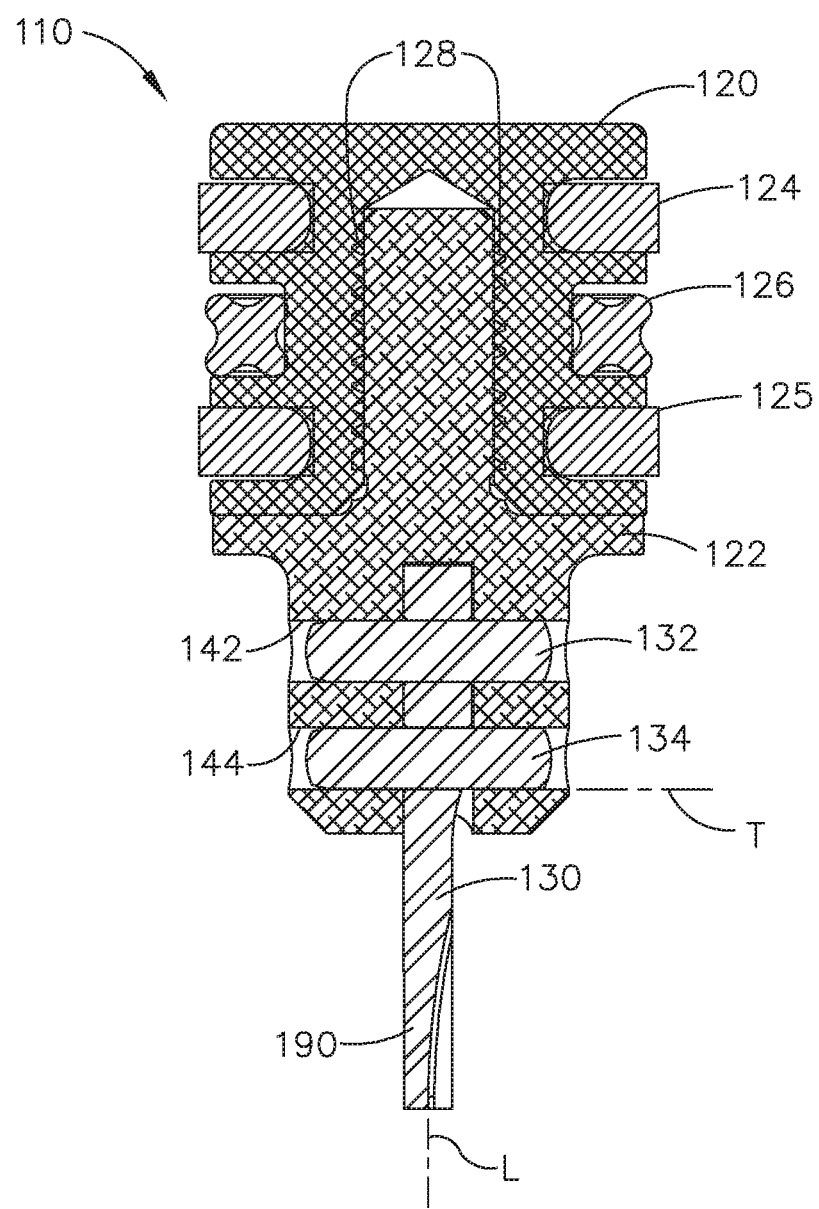
FIG. 6 is a section view along the line 6-6 of FIG. 5.
Figure 7:
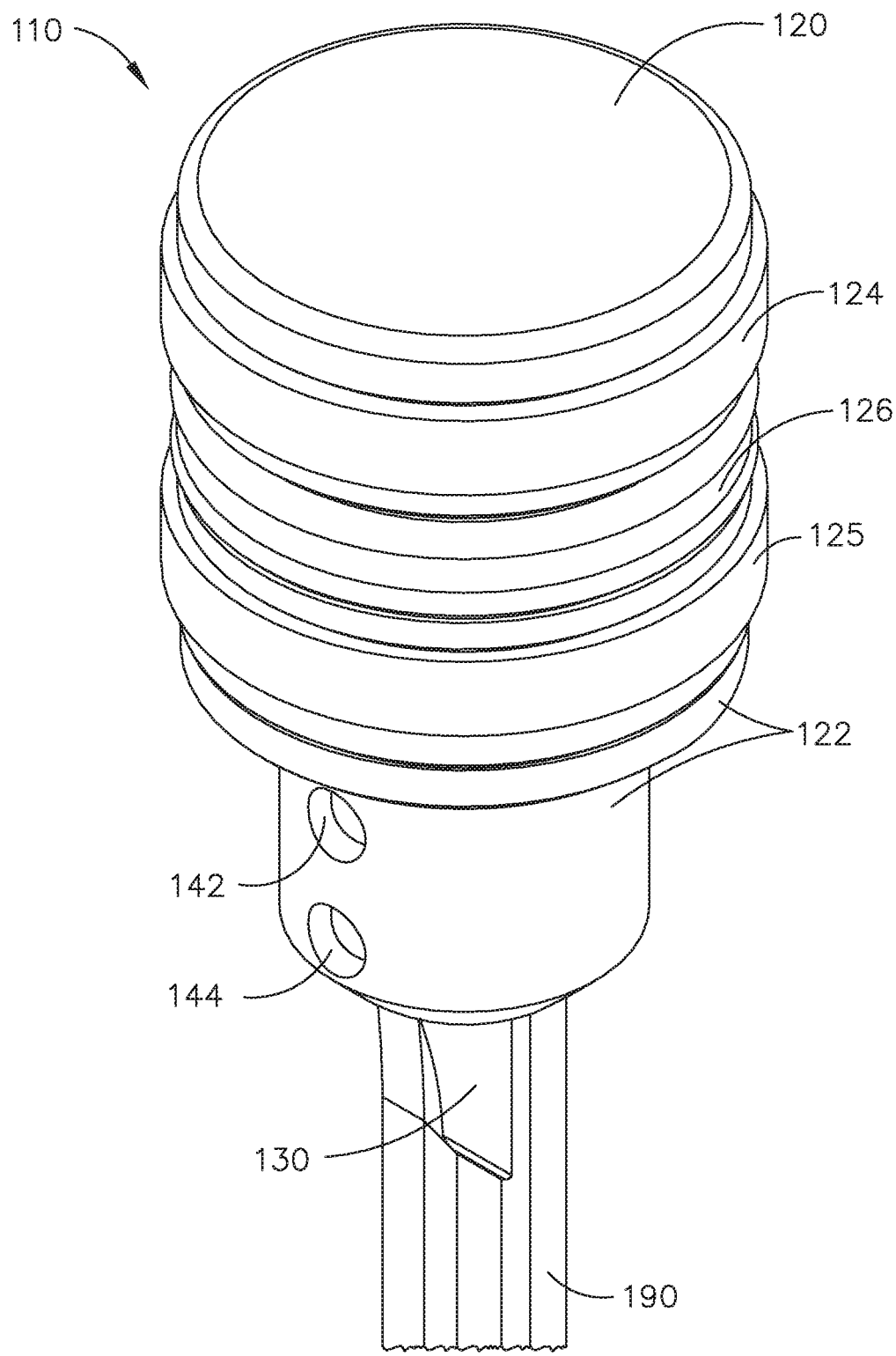
FIG. 7 is a perspective view of the second embodiment fastener driving tool of FIG. 5.
Figure 8:
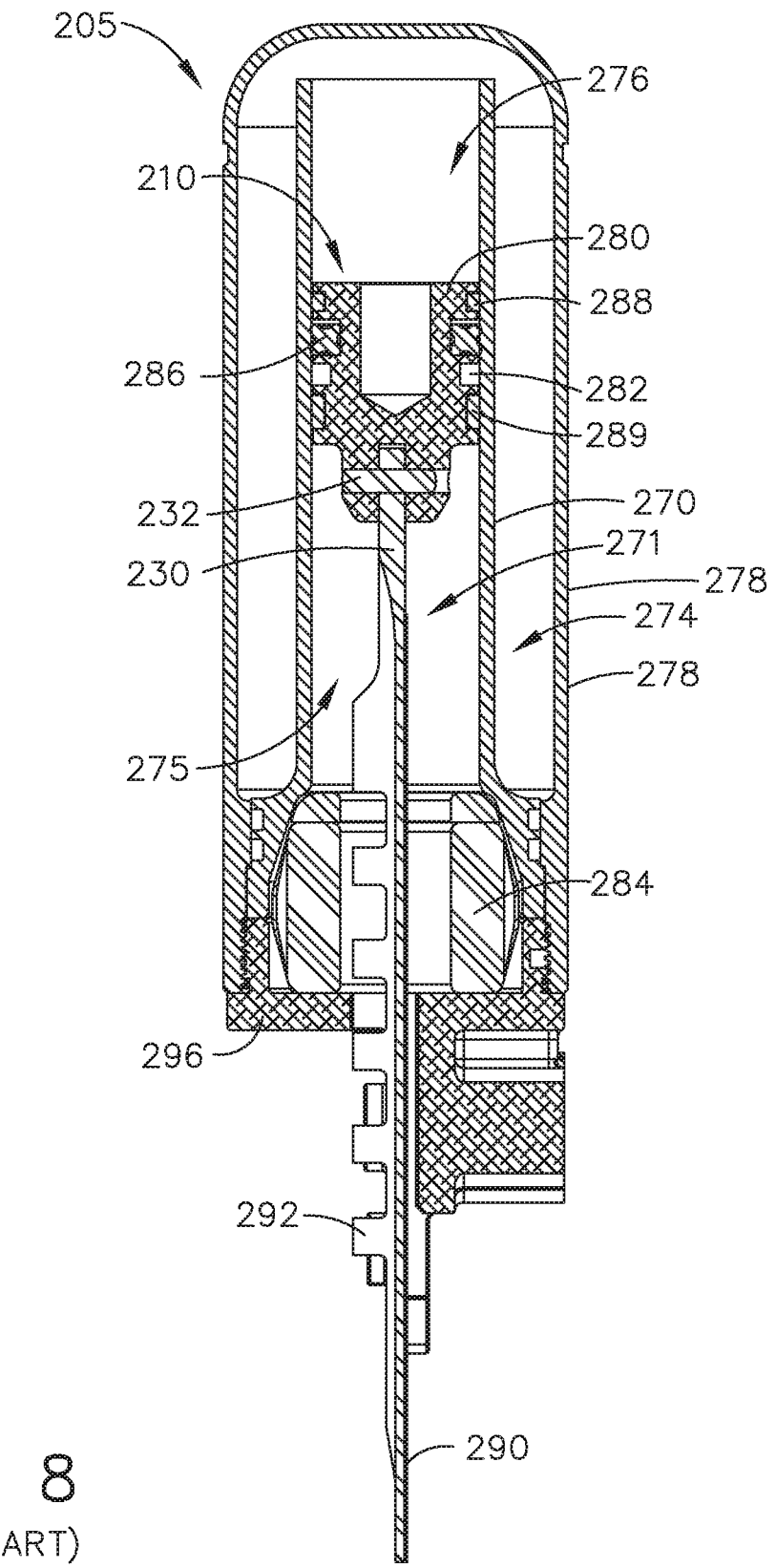
FIG. 8 is a section view of a fastener driving tool known in the prior art.

The general shape of piston subassembly 110 includes a cylindrical outer surface which has a circular cross-section, as can be seen in FIG. 7. The center of the circular cross-section is located along a longitudinal axis of the piston, in which that longitudinal axis can be seen at "L" on FIG. 6. It will be understood that the exact shape of the outer perimeter of the piston, and the exact shape of the corresponding inner surface of the cylinder sleeve, do not necessarily have to be precisely circular. Instead, these surfaces could have other geometric shapes, so long as they are "mating shapes," and still fall within the principles of the technology disclosed herein. With regard to the disclosure presented herein, it will be assumed that the piston indeed has a circular cross-section, and therefore, the inner surface of the cylinder sleeve is also circular.

A driver 190 (see FIG. 6) has an upper attachment portion 130 that is installed during manufacture into an opening in the piston bottom half 122. The piston bottom 122 exhibits two through openings 142 and 144 that are transverse to the driver opening. Two connecting pins 132 and 134 are used to secure the driver, at the driver upper portion 130, to the piston bottom 122. It will be understood that the various directional nomenclature provided above is with respect to the illustration of FIG. 5, and the first embodiment can be used in many other angular positions, without departing from the principles of this technology.

It will be again understood that this piston subassembly 110 is designed to move in a reciprocating manner along a direction that will be referred to herein as a longitudinal axis. On FIG. 6, such a longitudinal axis is designated by the letter "L."

The piston top 120 has three circumferential recesses or grooves located on the outside surface of the piston. The upper groove holds a circular-shaped material 124 that comprises a porous media, such as a foam material, and the lower groove holds another circular-shaped material of porous media (e.g., foam material) 125. The middle groove holds a circular seal 126. (Note that the annular seal 126 is also sometimes referred to herein as a "perimeter seal," since it runs around the outer perimeter of the piston. Moreover, the porous media—or foam piece—124 is sometimes referred to herein as a "first porous media," and the porous media—or foam piece—125 is sometimes referred to herein as a "second porous media.") In one embodiment, both foam pieces 124 and 125 hold a lubricant, and act as a reservoir for the lubricant. Preferably, the foam 124 and 125 comprises open cell foam. The foam 124 and 125 is in constant contact with the inner cylinder wall 71, slowly dispensing lubricant over the life of the tool.

The seal 126 is also in constant contact with the cylinder, and keeps the lubricant contained inside the cylinder. It is to be noted that the foam pieces 124 and 125 do not act as a seal per se, but are intended to store and dispense lubricant along the cylinder. Also, a second seal "above" the foam 124 is not necessary, because any lubricant that moves "above" the seal will be re-used. The lower foam piece 125, in addition to dispensing lubricant, also acts as a "wiper" or "catcher" for preventing outside debris from entering the seal's region of the tool in the area near the bottom of the cylinder 71.

In an alternate embodiment, the foam 125 does not contain lubricant. Instead, the foam mainly acts as a "wiper" or "catcher" for debris that finds its way into the bottom area of the working cylinder 71. If lubricant should happen to make its way past the seal 126 to this second foam piece 125, then the foam piece 125 will re-distribute that lubricant. Optionally, the second foam piece 125 can receive a "light" amount of lubricant at the time of manufacture.

The second foam material 125 in the embodiment of FIG. 6 is positioned "below" the seal 126 for a reason. As discussed above, the foam 125 acts as a "wiper" or "catcher" to keep outside debris from reaching the seal 126, thereby enhancing the life of the seal 126, and thereby extending the life of the tool by maintaining a high air pressure in the main storage chamber and in the spaces "above" the top of the piston (above the surface 120) for a longer time.

The second foam material 125 in the embodiment of FIG. 6 also acts as a "retainer" to keep the beneficial lubricant "above" that foam piece 125; i.e., it will tend to keep the lubricant where the piston travels inside the working cylinder. And, as such a "retainer," the foam material 125 tends to keep the lubricant from traveling "down" (in this view) to the workpiece surface, when a fastener is driven.

Figure 9:
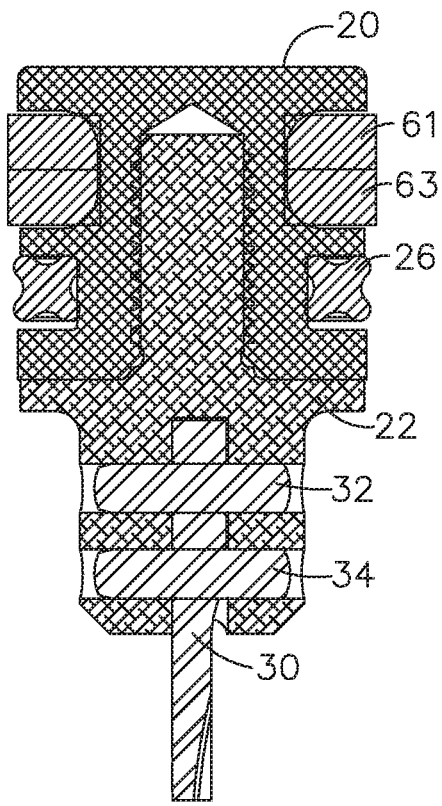
FIG. 9 is a section view similar to that of FIG. 2, in which a porous media, such as foam material, is arranged in stacks.
Figure 10:
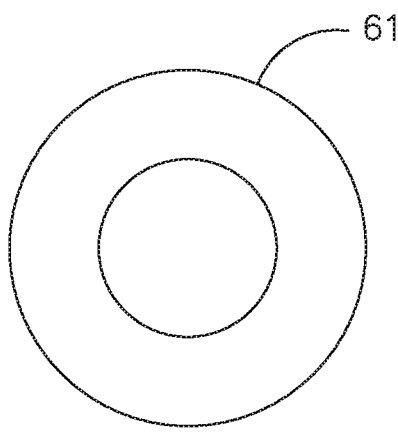
FIG. 10 is a top elevational view of the foam material of FIG. 9.

It should be noted that the porous media (such as foam pieces) 24, 124, and 125 in the various embodiments disclosed herein do not need to be formed of a single piece of material. For example, the foam pieces could be arranged as a stack of foam pieces each having a smaller thickness, such as the pieces 61 and 63 on FIG. 9. The top annular shape of this stack of smaller thickness foam pieces would have the shape depicted on FIG. 10.

Figure 11:
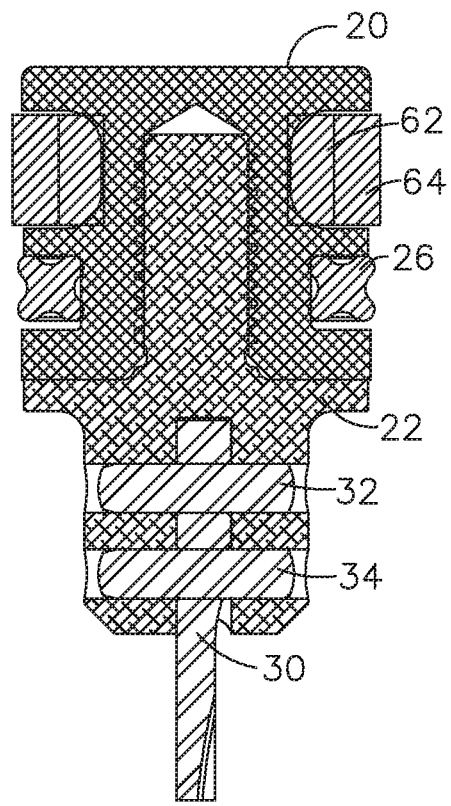
FIG. 11 is a section view similar to that of FIG. 2, in which a porous media, such as foam material, is layered, such that an outer layer covers or surrounds an inner layer.
Figure 12:
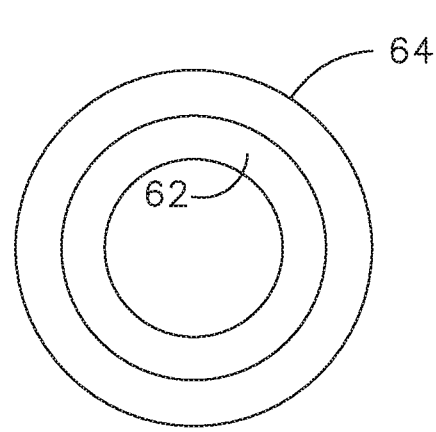
FIG. 12 is a top elevational view of the foam material of FIG. 11.

Furthermore, the porous media (such as foam pieces) 24, 124, and 125 in the various embodiments could be layered as different inner and outer diameters, such as the pieces 62 and 64 on FIG. 11, in which the outer layer 64 covers the inner layer 62. The top annular appearance of the shapes of those layered foam pieces would have the form illustrated on FIG. 12. In this configuration, the inner and outer foam pieces 62 and 64 could have different physical characteristics, if desired. For example, the inner foam piece 62 could be selected for having an ability to maximize a large quantity of lubricant that can be retained, whereas the outer foam piece 64 could be selected for having a superior wicking ability, which would more readily transfer lubricant from its inner diameter to its outer diameter, and hence to the piston's outer perimeter surfaces near the cylinder inner wall.

It will be understood that the references to an inner diameter or an outer diameter of the hollow cylinder or of the piston, seal, or foam pieces can be referred to by other words, such as an inner (or outer) width, or an inner (or outer) dimension, while referring to the same or a similar portion of the parts that make up the power tool design disclosed herein. This is especially true if the piston and working cylinder are not perfectly round in shape. For example, the piston's outer shape (in cross-section) and the working cylinder's inner shape (in cross-section) could be elliptical, rather than circular, if desired.

It will be further understood that the description of the piston 10 in FIG. 4, or the piston 110 in FIG. 6, for example, could be described as having "a top outer surface, a bottom outer surface, and a side wall outer surface that extends between the top and bottom outer surfaces," with reference to the characteristics of the combination of the upper piston portion 20 (in FIG. 4), the lower piston portion 22 (in FIG. 4), and the side walls 52, 54, and 56 (in FIG. 4), for example. Of course, the lower portion of the piston 22 also has side walls, which are not numbered on FIG. 4.

Finally, it will be additionally understood that the piston subassembly 10, or 110, could be constructed of a single piece of material, if desired by the designer of the power tool for which it will be used, without departing from the principles of the technology disclosed herein. Certain modifications would likely have to be made for that type of piston construction, but certainly the foam pieces (porous media) used to dispense lubricant could still be included so as to provide some important benefits, as described herein.

The principles discussed above and illustrated in the drawings can be further summarized in a series of short statements, such as follows:

{A1} A piston for use in a power tool, the piston comprising: a top outer surface, a bottom outer surface, and a cylindrical side wall outer surface that runs between the top and bottom outer surfaces, the piston having a circular cross-section; a first circumferential recess in the cylindrical outer surface of the piston; and an annular porous media positioned in the first circumferential recess, the porous media containing a liquid lubricant material.

{A2} The piston of the above paragraph plus the following features: a second circumferential recess in the cylindrical outer surface of the piston located at a different position along the outer surface of the piston; and an annular seal positioned in the second circumferential recess.

{A3} The piston of the above paragraph plus the following features: a hollow cylinder having a circular inner diameter that is larger than the cylindrical outer surface of the piston; wherein: the annular porous media makes physical contact with the circular inner diameter of the hollow cylinder as the piston moves through the cylinder in a reciprocating pattern; and the liquid lubricant material is used to lubricate a portion of the circular inner diameter of the hollow cylinder that is proximal to the cylindrical outer surface of the piston as the piston moves through the cylinder.

{A4} The piston of the above paragraph plus the following features: the annular seal makes physical contact with the circular inner diameter of the hollow cylinder as the piston moves through the cylinder in a reciprocating pattern; wherein: the annular seal prevents a majority of the liquid lubricant material from moving past the second circumferential recess in the cylindrical outer surface of the piston.

{A5} The cylinder with piston of the above paragraph plus the following features: a driver that is in mechanical communication with the piston; a guide body that guides the driver, and that receives a fastener to be driven by the driver to an exit portion of the guide body.

{A6} The cylinder with piston of the paragraph {A4} plus the following features: a main storage chamber that contains a pressurized gas; wherein: the cylinder including a variable displacement volume on a first side of the piston that is in pneumatic communication with the main storage chamber, and the cylinder including a variable venting volume on a second, opposite side of the piston that is in pneumatic communication with an outer environment; and the annular seal prevents a majority of the liquid lubricant material from moving into the outer environment; however, the liquid lubricant material is not prevented from moving toward the main storage chamber, where it will be re-used in later operational cycles.

{A7} The cylinder with piston of the paragraph {A4} plus the following features: the porous media is the sole source of lubricant for the hollow cylinder and piston, and the tool cannot be re-supplied with additional lubricant without disassembling the main storage chamber and hollow cylinder subassembly.

{A8} The cylinder with piston of the paragraph {A4} plus the following features: the porous media comprises open cell foam having an average cell density of about 60-80 pores per inch.

{A9} The cylinder with piston of the above paragraph plus the following features: the foam material comprises air filter material that is resistant to lubricating oil.

{A10} The cylinder with piston of the paragraph {A4} plus the following features: the liquid lubricant comprises premium ISO Viscosity Grade 68 slideway oil.

{A11} The cylinder with piston of the above paragraph plus the following features: the liquid lubricant comprises MOBIL VACTRA 2™ oil.

{A12} The cylinder with piston of the paragraph {A3} plus the following features: the liquid lubricant comprises lubricating oil; further comprising an anti-seize lubricant that is applied within said cylinder.

{A13} The cylinder with piston of the above paragraph plus the following features: the anti-seize lubricant comprises PERMATEX 133A™.

{B1} A working cylinder for a power tool, comprising: a hollow cylinder that includes a movable two-part piston, the cylinder including a variable displacement volume on a first side of the piston, and the cylinder including a variable venting volume on a second, opposite side of the piston; said two-part piston, comprising: a first portion made of a metallic material that is proximal to the second side of the piston, the first portion being sufficiently small in outer diameter so that it does not make physical contact with an inner surface of the hollow cylinder; a second portion made of a non-metallic material that is proximal to the first side of the piston, the second portion including at least one surface that makes slidable contact with the inner surface of the hollow cylinder, the at least one surface thereby acting as a slidable bearing surface for the piston; the first portion and the second portion being attached to one another in a manner such that the first and second portions always move together as a single piston subassembly.

{B2} The working cylinder of the above paragraph plus the following features: a first circumferential recess in the outer surface of the piston; and a porous media positioned in the first circumferential recess, the porous media containing a liquid lubricant material.

{B3} The working cylinder of the above paragraph plus the following feature: the porous media comprises an annular foam material.

{B4} The working cylinder of the above paragraph plus the following features: the annular foam material makes physical contact with the circular inner diameter of the hollow cylinder as the piston moves through the cylinder in a reciprocating pattern; and the liquid lubricant material is used to lubricate a portion of the circular inner diameter of the hollow cylinder that is proximal to the cylindrical outer surface of the piston as the piston moves through the cylinder.

{B5} The working cylinder of the paragraph {B2} plus the following features: a second circumferential recess in the cylindrical outer surface of the piston located at a different position along the outer surface of the piston; and an annular seal positioned in the second circumferential recess.

{B6} The working cylinder of the above paragraph plus the following features: the annular seal makes physical contact with the circular inner diameter of the hollow cylinder as the piston moves through the cylinder in a reciprocating pattern; and the annular seal prevents a majority of the liquid lubricant material from moving past the second circumferential recess in the cylindrical outer surface of the piston.

{C1} A piston for use in a power tool, the piston comprising: a top outer surface, a bottom outer surface, and a cylindrical side wall outer surface that runs between the top and bottom outer surfaces, the piston having a circular cross-section; a first circumferential recess in the cylindrical outer surface of the piston; and a first annular porous media positioned in the first circumferential recess; a second circumferential recess in the cylindrical outer surface of the piston, located at a different position along the cylindrical outer surface of the piston; a second annular porous media positioned in the second circumferential recess; and at least one of the first and second annular porous media containing a liquid lubricant material.

{C2} The piston of the above paragraph plus the following features: a third circumferential recess in the cylindrical outer surface of the piston located at a different position along the outer surface of the piston than the first and second circumferential recesses; and an annular seal positioned in the third circumferential recess.

{C3} The piston of the above paragraph plus the following feature: the first annular porous media comprises a first annular foam material; and the second annular porous media comprises a second annular foam material.

{C4} The piston of the above paragraph plus the following features: a hollow cylinder having a circular inner diameter that is larger than the cylindrical outer surface of the piston; wherein: the first and second annular foam material makes physical contact with the circular inner diameter of the hollow cylinder as the piston moves through the cylinder in a reciprocating pattern; and the liquid lubricant material is used to lubricate a portion of the circular inner diameter of the hollow cylinder that is proximal to the cylindrical outer surface of the piston as the piston moves through the cylinder.

{C5} The cylinder and piston of the above paragraph plus the following features: the annular seal makes physical contact with the circular inner diameter of the hollow cylinder as the piston moves through the cylinder in a reciprocating pattern; wherein: the annular seal prevents a majority of the liquid lubricant material from moving past the second circumferential recess in the cylindrical outer surface.

{C6} The cylinder and piston of the above paragraph plus the following features: the cylinder including a variable displacement volume on a first side of the piston that is in pneumatic communication with a main storage chamber of pressurized gas, and the cylinder including a variable venting volume on a second, opposite side of the piston that is in pneumatic communication with an outer environment; and the annular seal prevents a majority of the liquid lubricant material from moving into the outer environment; however, the liquid lubricant material is not prevented from moving toward the main storage chamber, where it will be re-used in later operational cycles.

{C7} The cylinder and piston of the above paragraph plus the following features: the first circumferential recess and the first annular foam material are positioned proximal to the first side of the piston; the second circumferential recess and the second annular foam material are positioned proximal to the second side of the piston; and the third circumferential recess and the annular seal are positioned between the first and second circumferential recesses along the outer surface of the piston.

{C8} The cylinder and piston of the above paragraph plus the following features: the first annular foam material contains a liquid lubricant upon manufacture, but the second annular foam material does not contain a liquid lubricant upon manufacture.

{C9} The cylinder and piston of the paragraph {C7} plus the following features: both the first and second annular foam materials contain a liquid lubricant upon manufacture.

{C10} The cylinder with piston of the paragraph {C4} plus the following features: the liquid lubricant comprises lubricating oil; further comprising an anti-seize lubricant that is applied within said cylinder.

{C11} The cylinder with piston of the above paragraph plus the following features: the anti-seize lubricant comprises PERMATEX 133A™.

{D1} A piston for use in a power tool, the piston comprising: a top outer surface, a bottom outer surface, and a side wall outer surface that runs between the top and bottom outer surfaces; a first recess in the side wall outer surface of the piston; and a porous media positioned in the first recess along the side wall outer surface of the piston, the porous media containing a liquid lubricant material.

{D2} The piston of the above paragraph plus the following features: a hollow cylinder having an inner dimension that is larger than the side wall outer surface of the piston; and the porous media makes physical contact with the inner diameter of the hollow cylinder as the piston moves through the cylinder in a reciprocating pattern; wherein: the liquid lubricant material is used to lubricate a portion of the inner diameter of the hollow cylinder that is proximal to the side wall outer surface of the piston as the piston moves through the cylinder.

{D3} The piston of the paragraph {D1} plus the following feature: said porous media comprises a foam material.

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, and 8,763,874; also published U.S. patent application No. 2016/0288305 and published U.S. patent application, No. 2018/0178361. These documents are incorporated by reference herein, in their entirety.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal" Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A driver assembly for use in a power tool, said driver assembly comprising:
    a movable piston, exhibiting a top outer surface, a bottom outer surface, and a side wall outer surface that extends between said top and bottom outer surfaces;
    a hollow cylinder having an inner surface that surrounds said side wall outer surface of the piston;
    a movable driver that is in mechanical communication with the piston;
    a guide body that guides said driver, and that receives a fastener to be driven by the driver toward an exit portion of said guide body;
    a first recess in said side wall outer surface of the piston;
    a porous media positioned in the first recess along said side wall outer surface of the piston containing a liquid lubricant oil stored therein, wherein said porous media is configured to dispense said liquid lubricant oil onto the inner surface of said hollow cylinder; and
    an anti-seize grease pre-applied to the inner surface of said hollow cylinder;
    wherein:
    both said liquid lubricant oil and said anti-seize grease provide lubrication to at least a portion of the inner surface of said hollow cylinder proximal to said side wall outer surface of the piston, as said piston moves through said hollow cylinder.

2. The driver assembly of claim 1, further comprising:
    a second recess in said side wall outer surface of the piston located at a different position relative to the first recess along said side wall outer surface of the piston; and
    a perimeter seal positioned in said second recess.

3. The driver assembly of claim 2, wherein:
    said perimeter seal makes physical contact with said inner surface of the hollow cylinder as the piston moves through said cylinder in a reciprocating pattern; and
    said perimeter seal prevents a majority of said liquid lubricant oil from moving past said second recess in said side wall outer surface of the piston, during an operating cycle of the piston's reciprocating motion.

4. The driver assembly of claim 3, further comprising:
    a main storage chamber that contains a pressurized gas;
    wherein:
    said cylinder includes a variable displacement volume on a first side of the piston that is in pneumatic communication with said main storage chamber, and said cylinder includes a variable venting volume on a second, opposite side of the piston that is in pneumatic communication with an outer environment; and said perimeter seal prevents a majority of said liquid lubricant oil from moving into said outer environment during an operating cycle of the piston's reciprocating motion; however, the liquid lubricant oil is not prevented from moving toward said main storage chamber, where it will be re-used in later operational cycles.

5. The driver assembly of claim 2, wherein: said piston exhibits a circular cross-section, said porous media is annular in shape, and said seal is annular in shape.

6. The driver assembly of claim 1, wherein:
said porous media comprises a foam.

7. The driver assembly of claim 1, wherein:
said porous media comprises open cell foam having an average cell density in a range of 60-80 pores per inch.

8. A driver assembly for use in a power tool, said driver assembly comprising:
a movable piston, exhibiting a top outer surface, a bottom outer surface, and a side wall outer surface that extends between said top and bottom outer surfaces;
a hollow cylinder having an inner surface that surrounds said side wall outer surface of the piston;
a movable driver that is in mechanical communication with the piston;
a guide body that guides said driver, and that receives a fastener to be driven by the driver toward an exit portion of said guide body;
a first recess in said side wall outer surface of the piston;
a first porous media positioned in said first recess;
a second recess in said side wall outer surface of the piston, located at a different position relative to the first recess along said side wall outer surface of the piston;
a second porous media positioned in said second recess;
at least one of said first porous media and second porous media containing a liquid lubricant oil stored therein, wherein said porous media is configured to dispense said liquid lubricant oil onto the inner surface of said hollow cylinder; and
an anti-seize grease pre-applied to the inner surface of said hollow cylinder;
wherein:
both said liquid lubricant oil and said anti-seize grease provide lubrication to at least a portion of the inner surface of said hollow cylinder proximal to said side wall outer surface of the piston, as said piston moves through said hollow cylinder.

9. The driver assembly of claim 8, further comprising:
a third recess in said side wall outer surface of the piston located at a different position along said side wall outer surface of the piston than said first and second recesses; and
a perimeter seal positioned in said third recess.

10. The driver assembly of claim 9, wherein:
said perimeter seal makes physical contact with said inner surface of said hollow cylinder as the piston moves through said cylinder in a reciprocating pattern; and
said perimeter seal prevents a majority of said liquid lubricant oil from moving past said third recess in said side wall outer surface, during an operating cycle of the piston's reciprocating motion.

11. The driver assembly of claim 9, further comprising:
a main storage chamber that contains a pressurized gas;
wherein:
said cylinder includes a variable displacement volume on a first side of said piston that is in pneumatic communication with said main storage chamber of pressurized gas, and said cylinder includes a variable venting volume on a second, opposite side of the piston that is in pneumatic communication with an outer environment;
said perimeter seal prevents a majority of said liquid lubricant oil from moving into said outer environment; and
said liquid lubricant oil is not prevented from moving toward said main storage chamber, where it will be re-used in later operational cycles.

12. The driver assembly of claim 11, wherein:
said first recess and said first porous media are positioned proximal to said first side of the piston;
said second recess and said second porous media are positioned proximal to said second side of the piston; and
said third recess and said perimeter seal are positioned between said first and second recesses along said outer surface of the piston.

13. The driver assembly of claim 9, wherein: said piston exhibits a circular cross-section, said first porous media and second porous media both are annular in shape, and said seal is annular in shape.

14. The driver assembly of claim 8, wherein:
said first porous media and second porous media both comprise a foam.

15. The driver assembly of claim 8, wherein:
said first porous media and second porous media both comprise open cell foam having an average cell density in a range of 60-80 pores per inch.

* * * * *